United States Patent [19]

Carter et al.

[11] 4,199,961
[45] Apr. 29, 1980

[54] METHOD AND APPARATUS FOR CONTINUOUSLY FREEZING AND MELTING A FLUID MIXTURE

[75] Inventors: Larry D. Carter, Arvada; Silas W. Clark, Golden, both of Colo.

[73] Assignee: Roldiva, Inc.

[21] Appl. No.: 877,126

[22] Filed: Feb. 13, 1978

[51] Int. Cl.² .............................................. B01D 9/04
[52] U.S. Cl. ........................................ 62/535; 62/542; 62/335; 62/332; 62/238; 60/648; 60/39.18 B
[58] Field of Search ................. 62/532, 535, 542, 534, 62/510, 501, 332, 335

[56] References Cited

U.S. PATENT DOCUMENTS

| | | | |
|---|---|---|---|
| 2,548,508 | 4/1951 | Wolfner | 62/332 |
| 2,613,513 | 10/1952 | Shields | 62/544 |
| 3,119,772 | 1/1964 | Hess et al. | 62/534 |
| 3,132,096 | 5/1964 | Walton | 62/533 |
| 3,155,610 | 11/1964 | Williams | 62/533 |
| 3,304,734 | 2/1967 | Dunn | 62/535 |
| 3,802,349 | 6/1974 | Styron et al. | 62/532 |
| 3,803,860 | 4/1974 | Nagashima et al. | 62/534 |
| 3,824,804 | 7/1974 | Sandmark | 62/332 |

*Primary Examiner*—Norman Yudkoff
*Attorney, Agent, or Firm*—Bruce G. Klaas; Dennis K. Shelton; David J. Aston

[57] ABSTRACT

Method and apparatus for continuously freezing and melting a fluid mixture, for use in separating a fluid mixture into dilute and concentrated components which have been made separble due to the freezing. A turbine is used to produce mechanical energy to drive a refrigeration compressor, while exhaust heat from the turbine is used for secondary cooling. Heat from a refrigeration condenser is used to melt the liquid frozen by a refrigerant evaporator. The evaporator and condenser may comprise a plurality of plates or may comprise a bubbler for bubbling refrigerant directly into contact with the fluid mixture.

23 Claims, 3 Drawing Figures

METHOD AND APPARATUS FOR CONTINUOUSLY FREEZING AND MELTING A FLUID MIXTURE

BACKGROUND OF THE INVENTION

The present invention relates to refrigeration, and to separation, and more particularly to separating fluid mixtures into dilute components and concentrated components by freezing and then melting the frozen fluid. Fluid mixtures include suspensions, solutions, emulsions and the like.

Freeze-melt techniques in the present field of art may be exemplified by several prior art applications of these techniques. For instance, Hadzeriga, in U.S. Pat. No. 3,681,931, describes the treatment of phosphate rock slimes by freezing. Upon melting, the mixture separates into a top layer of clear liquid substantially free of suspended matter and a bottom layer of concentrated suspension.

Phosphate slime is a colloidal, aqueous suspension which is normally difficult to separate and is left in large settling ponds appurtenant to the mining operation which produced it. In the freeze-melt process, the slime is "statically frozen" by freezing a substantial portion of the liquid in a quiescent, non-agitated state to temperatures preferably between −20° C. and −80° C. Slow freezing produces better separation by producing larger ice crystals to compact suspended solids. After freezing, static thawing is carried out at ambient temperature.

Prior art processes and equipment for the treatment of phosphate slimes have, insofar as is known, heretofore been of the "bulk freezing" type wherein a container of slime is filled, frozen, melted and decanted. After the separated components have been removed, the container is refilled, and the cycle is begun again.

Freeze-melt techniques have also been applied to treatment of sewage sludge. Sewage sludge is an aqueous organic colloidal suspension which is difficult to separate by filtration or settling. Sludge which has been frozen and melted can be filtered quite easily, however. Sludge freezing process efficiency has been found to be independent of freezing temperature, length of time the sludge was kept frozen, and the thickness of the sludge. Process efficiency does, however, depend on the slow and full freezing of the sludge.

A sludge freezing plant typically employs a vapor compression refrigeration type system. Ammonia may be used as the refrigerant. The sludge is contained in a first large tank and cold, vaporizing ammonia is passed through an evaporator comprising vertical pipes passing through the tank. The hot, vaporized ammonia is then passed through pipes in a second tank which holds previously frozen sludge which is to be melted by the warm vapor. When a tank is fully frozen, the flow of ammonia is reversed, and melting begins in the first tank, and freezing begins in the second. After a "batch" has been melted, the tank contents are emptied through the bottom of the tank and passed to a filter for separation.

Freeze-melt techniques have also been applied to the desalinization of sea water. Separation is based on the fact that when salt water is partially frozen, the ice crystals that form are free of salt. In a desalinization plant described by G. Karnofsky in *Chemical Engineering Progress*, Volume 57, No. 1, January 1961, p. 42, butane is used as the refrigerant in a vapor compression refrigeration system. The seawater is frozen by a direct contact with boiling butane at slightly less than 1 atm. pressure. The butane vapor from the freezer is then compressed and condensed by cold from previously formed ice. The vapor in turn warms and melts the ice. Melted water is passed out through a heat exchanger against entering seawater. The condenser and heat exchanger arrangement is designed to improve the thermal efficiency of the system.

Briefly, in a vapor compression system, the refrigerant in a vapor phase is first compressed by a compressor, then cooled in a condenser to liquid form. This is the high pressure side of the system. The liquid refrigerant then passes through an expansion valve, which maintains pressure on the high side, to the low pressure side of the system. There, the refrigerant passes through an evaporator, where it is vaporized and expands, thus absorbing heat and causing refrigeration of the material surrounding the evaporator. The vaporized refrigerant is passed to the compressor to complete the cycle. Just as heat is absorbed by the refrigerant due to vaporization in the evaporator, heat is liberated in the condenser due to the condensation there.

A principal problem to be overcome in a freeze-melt process is thermal efficiency. The thermal efficiency of a vapor compression refrigeration system is related to the condenser and evaporator temperatures. The thermal efficiency of a refrigeration system may be expressed as:

$$C.O.P. = \frac{\text{net refrigeration effect, B.t.u./lb}}{\text{heat of compression, B.t.u./lb}} = \frac{T_1}{T_2 - T_1} \quad (1)$$

where:
$T_1$ = evaporator temperature, absolute;
$T_2$ = condensing temperature, absolute; and
C.O.P. = the coefficient of performance of the refrigeration cycle.

The heat of compression is expressed as:

$$\text{Heat of compression} = h_d - h_g \quad (2)$$

where:
$h_d$ = enthalpy of vapor leaving the compressor, B.t.u./lb; and
$h_g$ = enthalpy of vapor entering the compressor, B.t.u./lb.

Enthalpy refers to the heat content of the refrigerant. The net refrigeration effect refers to enthalpy lost in the evaporator. It can be seen from equation (1) above that the smaller the difference between the evaporator temperature and the condensing temperature, the more efficient the process will be. Since enthalpy of the vapor is related to temperature, equation (2) demonstrates that lowering the necessary compressor temperature and pressure differences will also increase refrigeration efficiency.

SUMMARY OF THE INVENTION

A thermally efficient, economical, freeze-melt system is provided by the present invention. A significant improvement in thermal efficiency is obtained by condensing and evaporating the coolant over a narrow temperature range. Secondary cooling means, for cooling the refrigerant in addition to the cooling of the evaporator, reduces the temperature necessary for refrigerant liquification. The secondary cooling means may comprise an absorption chiller and/or vapor compression apparatus, heat exchangers, and/or vapor jet ejection apparatus.

Thermal efficiency is also achieved by using plates with a large surface area for the evaporator and condenser and by using direct refrigerant contact with the fluid mixture.

The present system is also efficient in that it operates in a continuous, rather than a bulk mode and utilizes condenser heat for melting frozen fluid. Additionally, thermal and economic efficiency is improved by the use of a motor means which produces both mechanical energy to power the compressor and recoverable by-product heat to power a secondary cooling means. A gas turbine engine with mechanical drive may be used as the motor means. The present invention also involves the use of coal gas to power the gas turbine. Exhaust heat from the turbine is rejected to the secondary cooling means for cooling the refrigerant in addition to the cooling of the evaporator.

The present invention may employ several alternative embodiments of refrigeration systems wherein ice is continuously formed and melted by condenser heat. In one embodiment, a so-called plate-type ice slusher, evaporator plates and condenser plates are submerged in a large container of a fluid mixture to be treated. The condenser plates serve to cool and condense vaporized, compressed refrigerant from a compressor, and the frozen fluid mixture is in turn warmed thereby. The condensed refrigerant then passes to evaporator plates where the fluid mixture is frozen as the refrigerant vaporizes and absorbs heat. A thin layer of liquid is frozen on the evaporator plates. The frozen fluid is removed from the plates by momentarily reversing refrigerant flow to liberate, rather than absorb, heat from the evaporator plates. The removed ice then floats to the condenser plates to be melted. When separating a fluid mixture into a dilute component and a concentrated component, the concentrated component will in some cases, for example seawater, migrate to the bottom of the container, where it may be removed, and the dilute component, from melted frozen liquid, may be removed from the top of the container. In other cases, such as phosphate slime, the ice will contain both components and is removed for separation by decanting, filtration, centrifugation, etc.

Another embodiment of a refrigeration system of the present invention involves direct contact of the refrigerant with the fluid mixture. Rather than passing the refrigerant through evaporator plates or tubes, the refrigerant is bubbled directly into the fluid mixture. The evaporation of the refrigerant permits the collection of vaporized refrigerant at the top of the container and causes the fluid mixture contacting the bubbles to freeze. Frozen liquid is melted either by a condenser in the first, freezing container, or by direct contact with vaporized refrigerant in a second container, whereby vaporized refrigerant is also condensed.

DESCRIPTION OF THE PREFERRED EMBODIMENT

Figure 1:
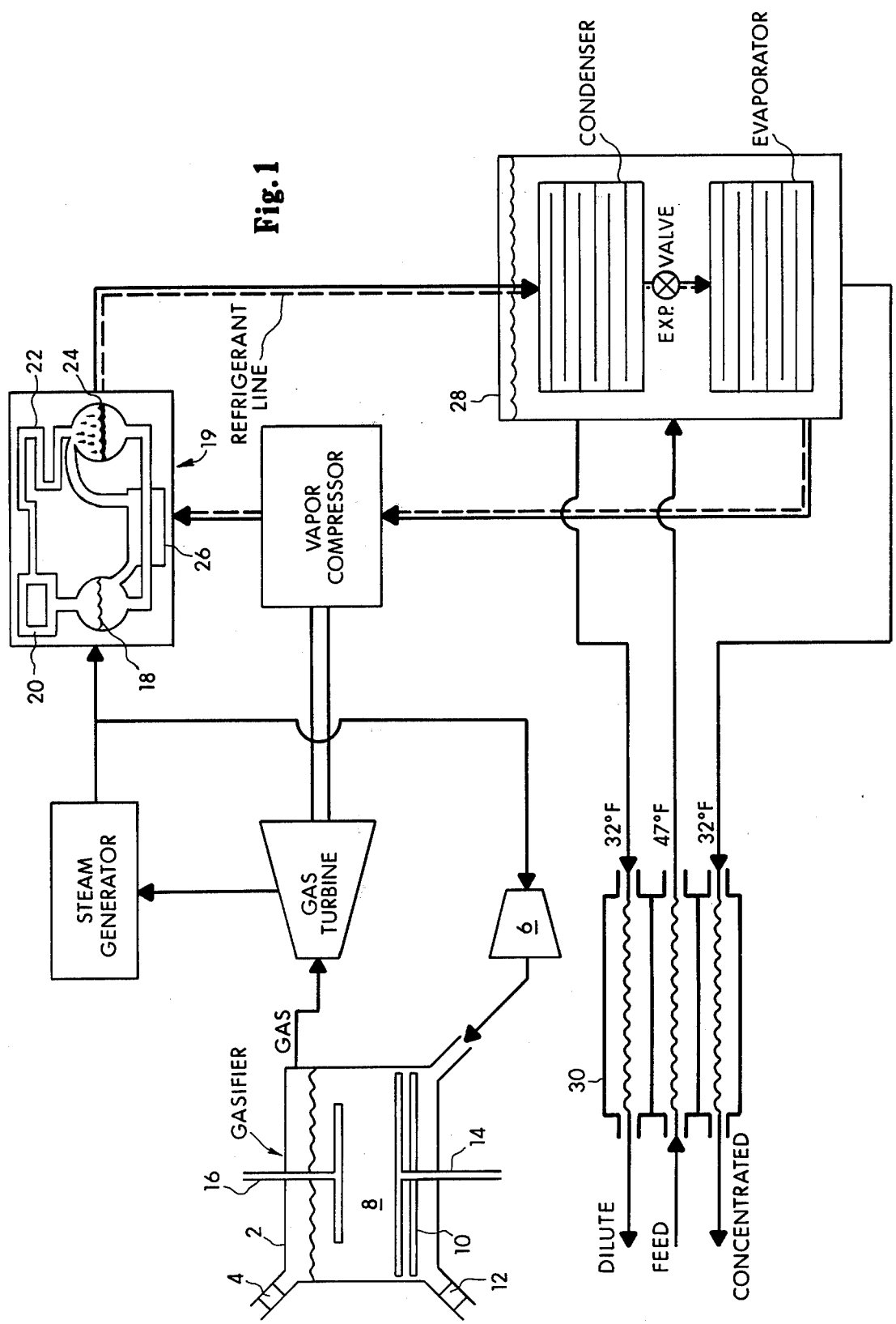
FIG. 1 is a flow diagram of a freeze-melt system of the present invention with a plate-type ice slusher.

Referring now to FIG. 1, the power supply of the present freeze-melt system is seen to comprise a coal gasifier operably connected to a gas turbine which outputs to a vapor compressor and a steam generator.

The coal gasifier converts coal to a fuel gas comprising hydrogen, carbon monoxide, and nitrogen. Coal gasification is well known. Carbon in the coal is reacted with air or oxygen, steam, and heat, preferably in a pressurized environment to produce the fuel gas. The gasifier comprises a pressurized vessel 2 wherein the fuel-forming reactions occur. Coal is fed to the vessel through a pressure maintaining feeding mechanism 4, such as a lockhopper or extruder, near the top of the vessel. Air and steam under pressure from a compressor 6 are introduced to the bottom of the vessel 2, countercurrent to incoming coal. A bed of coal 8 is maintained on a grate 10 located above the gas inlet so that the air and steam flow throgh the bed. Ash falls to the bottom of the vessel and is removed through a pressure maintaining removal mechanism, such as a lockhopper 12 at the bottom of the pressure vessel.

An agitator 14 near the grate is rotated to feed ash into the exit mechanism 12. The agitator is also capable of vertical movement to scrape ash from the walls of the vessel and to break up masses of ash. A stirrer 16 is also provided to stir the coal bed and prevent caking which inhibits the flow of product gas. Product gas is removed from the top of the vessel. The gas is cleaned of contaminants by known techniques. The vessel 2 operates at about 300 psi and the product gas is also under high pressure. The gas is also hot. These two factors make the gas advantageous for use in a gas turbine. The combination of a gas turbine and gasifier is further advantageous in that a single compressor 6 can be used to compress air for both devices.

The gas turbine which is fueled by the gasifier is a conventional standard mechanical drive gas combustion turbine having sufficient output to drive a main vapor compressor. In the turbine, incoming compressed air and fuel gas are burned in a combustor. The hot, expanded combustion gases exist through a nozzle directed at a bladed wheel or turbine. Rotation of the turbine produces mechanical drive. Exhaust gases are treated variously in different turbines. In the present system, heat by-product energy in the form of exhaust gas is used to create steam in a boiler. The boiler, or steam generator, is used to provide steam to the coal gasifier as well as to secondary cooling means, such as an absorption chiller.

Turning now to the refrigeration system, an absorption chiller 19 is used to provide secondary cooling means in the refrigerant circuit as the compressed refrigerant is being passed to the condenser. The absorption chiller used in the present invention is a commercially available refrigeration unit, as sold, for instance, by the Trane Company, LaCrosse, Wisconsin. An absorption chiller uses steam or hot water to evaporate a refrigerant, such as water, from a solution of an absorbent, such as lithium bromide, in a generator 18. An absorption chiller is particularly adapted for use with the present system because it uses steam which can be created by turbine exhaust and which can also be fed into the coal gasifier. The water boiled by the steam is condensed in a condenser 20, usually with the aid of a cooling stream of water in the absorption chiller. The refrigerant water is then evaporated in an evaporator 22 under a vacuum to produce the cooling effect. The water vapor is next recovered in an absorber 24 by its contact with concentrated lithium bromide solution from the generator 18. A heat exchanger 26 improves thermal efficiency by exchanging heat between the weak solution from the absorber 24 and the hot concentrated solution from the generator 18.

The main condenser and evaporator of the present invention are located in a large tank 28 which contains the fluid mixture, such as phosphate slime, to be treated. The evaporator and condenser may comprise a plurality of substantially identical plates. A plate is a rectangular container divided into a number of horizontal fluid passageways on the order of 2 inches (5 cm) wide and alternating in direction of flow. The plates may also be finned to provide a maximum surface area for heat transfer. Refrigerant flows from the secondary cooling means to the condenser plate or plates, and from the condenser through a standard expansion valve to the evaporator plate or plates. A capillary tube may be used in place of an extension valve to flash the refrigerant into the evaporator. Both the condenser and evaporator ae beneath the surface of the fluid in the tank. The fluid mixture enters the tank through an inlet valve located approximately in the middle of the tank. The evaporator plate is located beneath the condenser plate so that when a thin layer of ice forms on the evaporator, the ice may be dislodged from the evaporator to float to the condenser, or the vicinity thereof, where the ice will be melted by the condensation of the warm refrigerant. Melted ice, which constitutes the dilute component of the fluid mixture input, is drawn off near the top of the tank. The concentrated component sinks to the bottom and is drawn off through the bottom of the tank 28.

The preferred embodiment of the present invention when using evaporator plates comprises a series of parallel condenser and evaporator plates. Due to the insulative properties of ice, only a thin layer (about 0.25 in., 0.6 cm) of ice is permitted to form on an evaporator plate. When an evaporator plate is loaded, refrigerant flow to that plate is momentarily reversed so that vapor from the compressor is passed to the evaporator plate, in effect causing the evaporator plate to function as a condenser plate, liberate heat, and partially melt and clear the ice from the evaporator. The evaporator plates are cleared sequentially so that ice is constantly being generated, melted and decanted. A continuous flow of fluid mixture can thereby be maintained through the system. If a single evaporator plate is used, the system may still be termed continuous because when the evaporator is being cleared, melted ice is at that time being produced at the evaporator and fluid mixture may continue to flow into the tank. Regardless of the particular embodiment used, fluid is melted within a short time after it is frozen, within thirty minutes and preferably within five to ten minutes.

For thermal efficiency, a countercurrent heat exchanger 30 is used to cool incoming feed mixture and warm the outgoing products, which are near freeze temperature.

The vaporized refrigerant from the evaporator is returned to the compressor, which is driven by the gas turbine above described. The compressor may be of any type known for use in vapor compression systems. Due to the pressure head and volume requirements of a plate-type system, a piston or centrifugal type compressor is presently preferred.

While Freon R-12 is the presently preferred refrigerant, any compressible, condensible gas may be used in the preceding refrigeration system.

Figure 2:
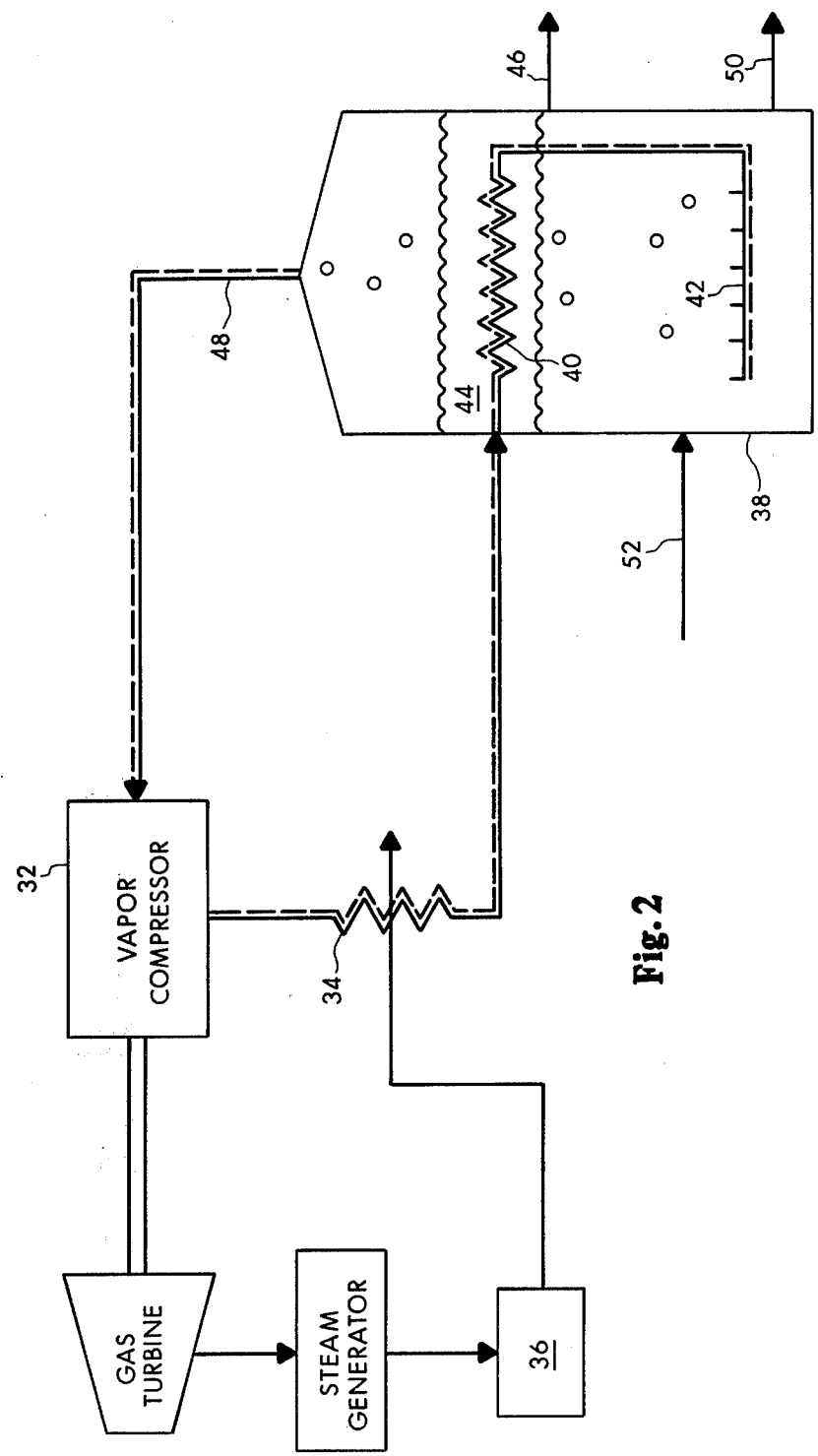
FIG. 2 is a flow diagram of a freeze-melt system of the present invention having a direct contact type refrigeration unit.

Referring now to FIG. 2, an embodiment of a refrigeration system of the present invention is illustrated wherein the refrigerant is bubbled into direct contact with the fluid mixture. Evaporator plates are not used. It is therefore necessary that the refrigerant be immiscible and unreactive with the fluid mixture. For aqueous suspensions, a hydrocarbon, such as isobutane, and, especially, butane is preferred.

The vapor compressor 32 of the direct contact system again may be any compressor having sufficient pressure and gas volume capability. An axial compressor is preferred in the direct contact system insofar as the system is characterized by high volume, low pressure difference requirements.

The direct contact embodiment of the present invention also employs a turbine, preferably a gas turbine, in the power system. The turbine outputs to a steam generator which provides steam power for secondary cooling means 34, which may be an absorption chiller as described above. Instead of an absorption chiller, a Rankine cycle engine 36 may be used to drive a vapor compression unit as the secondary cooling means 34. A Rankine cycle engine refers to any engine wherein a hot, vaporized gas expands to do work, being in turn cooled thereby, and is condensed and returned for revaporization. For instance, steam turbines are available commercially in which the steam from the turbine is condensed and pumped back to the steam drum for revaporization. Such a steam turbine 36 may be selected for use with a vapor compression refrigeration system as is known in the art. Further information on Rankine cycle engines is contained in *Introduction To Chemical Engineering, Thermodynamics*, Sec. 9-1, by J. M. Smith & H. C. Van Ness (McGraw-Hill, 1959), hereby incorporated by reference. Mechanical power from the steam turbine 36 is used to drive the compressor in the secondary cooling means 34. It is also contemplated that the secondary cooling means 34 may comprise vapor ejection apparatus using steam directly from the steam generator.

The cooled, compressed refrigerant is then passed into a tank or container 38 containing a quantity of fluid mixture to be frozen and separated. The refrigerant passes through a condenser 40 submerged just under the surface of the fluid. Condenser 40 may be of the plate type or it may comprise a number of tubes, or it may be arranged in other configurations which present a large exterior surface area. The refrigerant gives up its latent heat of vaporization in the condenser 40 and is condensed to liquid form. It then flows down to a bubbler 42 located near the bottom of the container. The bubbler is simply a sparger, or a manifold, or a series of capillary tubes through which the refrigerant can pass into the fluid mixture. Numerous small passages are preferred to few, large passages. The refrigerant emerging from the bubbler will expand and vaporize almost immediately upon its emergence from the bubbler. This will result in the absorption of heat by the refrigerant from the fluid mixture at the interface between each bubble and the surrounding mixture. A portion of the fluid mixture will thereby be frozen and float to the top of the fluid mixture to form a slush layer 44. The frozen material is in slush form, being near the freezing temperature. When melted, the frozen material provides the dilute component of the fluid mixture, which is drawn off through output line 46 from the upper portion of the container 38. The vaporized refrigerant will continue to rise through the tank, where it is collected by an uppermost gas outlet line 48 and returned to the vapor compressor 32. A concentrated output line 50 removes the denser, concentrated component of the fluid mixture from the bottom portion of the tank below the bubbler 42. An input liner 52 feeds fluid mixture to a middle portion of the tank between the bubbler 42 and the slush layer 44. Input fluid is continuously fed into the container as dilute and concentrated components are bled off. The level of fluid is maintained so that the condenser 40 is located near the top of the fluid mixture, in contact with the forming slush. The heat from the condenser is thus transmitted to the frozen fluid mixture to provide thermal energy for melting the slush, the slush in turn providing cooling for condensation of the refrigerant.

Figure 3:
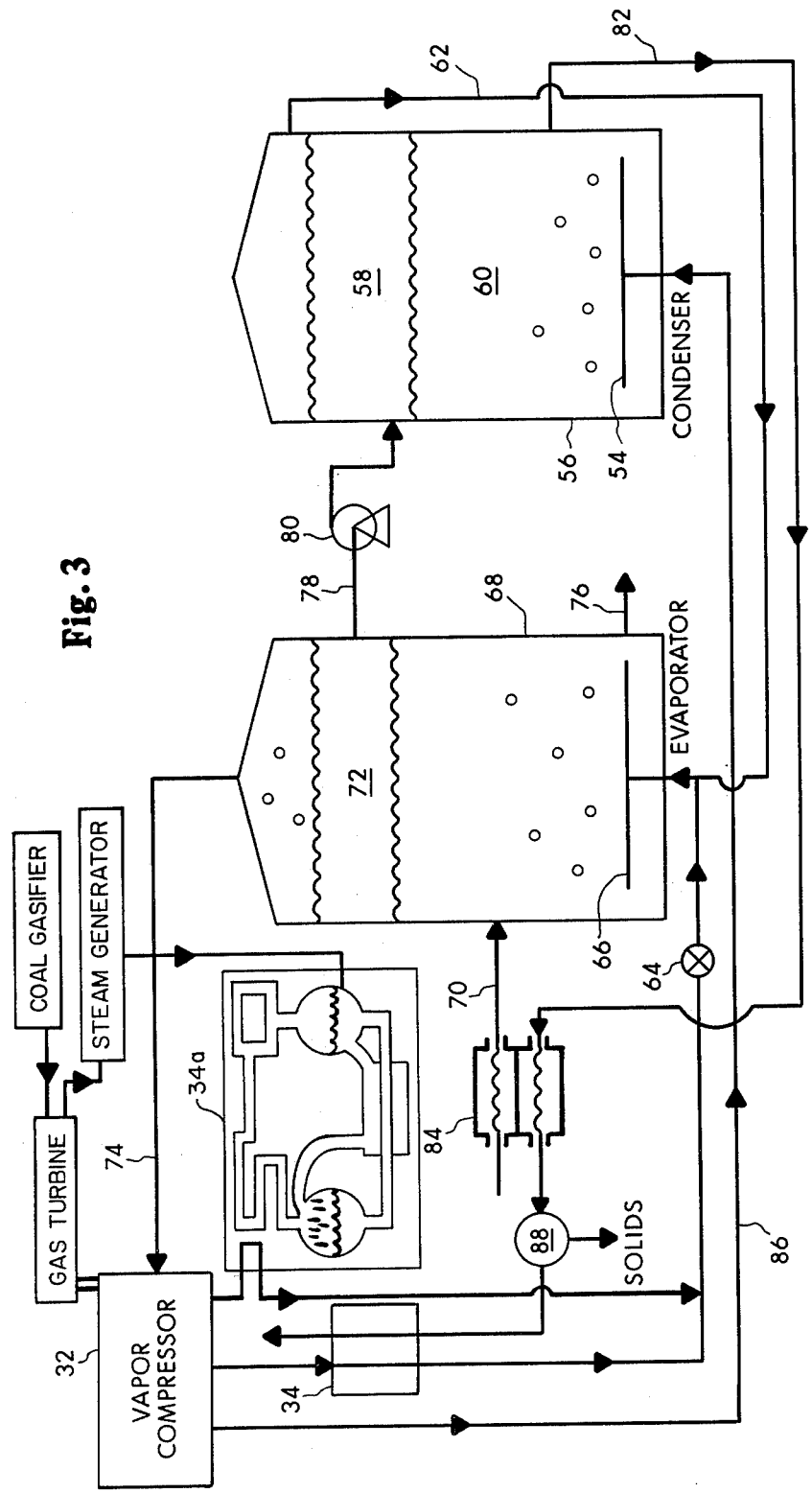
FIG. 3 is a flow diagram of a freeze-melt system of the present invention having a direct contact refrigeration system utilizing direct contact condensation.

Referring now to FIG. 3, there is illustrated a form of direct contact refrigeration system which employs direct contact for both freezing/evaporation and melting/condensation, thereby eliminating the need for a metal condenser.

Refrigerant is compressed in vapor compressor 32 and is passed to secondary cooling means 34 as in the embodiments of FIGS. 1 and 2. The compressed vapor is then passed to a bubbler 54, containing numerous small gas passages. The bubbler 54 is located near the bottom of a condenser container 56 containing a layer of previously formed slush 58. The slush, or frozen fluid mixture, contains primarily the dilute component of the mixture. As the slush melts, it contributes to the dilute component layer 60, on which the slush 58 is floating. The compressed refrigerant vapor passes through the bubbler 54 into the dilute component 60 and through the slush layer 58. During the passage, the refrigerant is condensed, in turn transferring heat to melt the slush. The condensed liquid refrigerant, such as butane, in addition to being immiscible and unreactive with water is also less dense than water. The condensed refrigerant therefore floats on top of the slush layer 58. The condensed refrigerant is drawn off the top of the slush layer through line 62 to a second bubbler 66 located in the bottom portion of a second, or evaporator container 68. The second container 68 contains fluid mixture input to an intermediate portion of the tank through line 70. The refrigerant passing from the condenser container 56 through line 62 to the bubbler 66 vaporizes as it emerges from the bubbler 66 and rises through the fluid mixture, absorbing heat and forming frozen fluid mixture at the interfaces of the bubbles. The frozen fluid rises to the top of the fluid mixture and forms a slush layer 72 floating on the fluid mixture. The vaporized refrigerant is collected at the top of the evaporator container 68 and returned through a line 74 to the vapor compressor 32. As stated, the slush layer includes mostly the dilute component of the mixture. The remaining, concentrated component then settles towards the bottom of the second container 68 from which it is removed through output line 76 located in the bottom portion of the container, below the bubbler 66. The slush layer 72 feeds to output line 78 to the first container 56 where it comprises the above mentioned slush layer 58. Transport of the slush from the first container to the second container is facilitated by a pump 80, although a gravity feed may also be used. Input fluid mixture continuously enters the evaporator container 68 through line 70 at a rate corresponding to the formation and removal of ice slush from the evaporator container 68 to the condenser container 56 wherein slush is continuously melted by contact with condensing refrigerant. A constant level of fluid is maintained in the condenser container by controlling the rate of flow of dilute component, melted from slush, which is drawn off through line 82 in the bottom portion of the container.

The method and apparatus for the present invention are presently contemplated for use in the separation of fluid mixtures into concentrated and dilute components, such as the separation of phosphate slime into water and minerals. An important feature in a separation process is the continuous freezing and melting of the mixture. There is no necessity for storing or holding the material in a frozen state. There is thus provided an advantage over bulk freezing techniques in that there is no requirement for holding a portion of stored fluid while the remainder is being frozen. A further, practical advantage of a continuous process is that the heat transfer surface is much smaller than in bulk freezing. A further advantage of the present invention is the low temperature difference required, resulting in a high coefficient of performance. This is demonstated in the following example.

EXAMPLE

Using the embodiment of FIG. 3, the following example gives values for design consideration in a freeze-melt system of the present invention. The system is designed for use in the separation of 3% solids clay waste phosphate slime from a mine producing 238 ton/hr (214 metric ton) solid waste in the slime. The slime settles to 12% in settling ponds in about 30 days. The 12% slime from the bottom of a pond, at 85° F. (29° C.) is passed through a heat exchanger against exiting treated slime, as shown at 84, reducing input slime temperature to 42° F. (6° C.). The slime is frozen, transferred by gravity to the first, condenser, container by gravity, and then thawed. In the present example, all melted phosphate slime (concentrated as well as dilute components) is removed from the condensing tank through line 82. The melted slime is at 32° F. (0° C.) as it passes through heat exchanger 84 where it is passed against incoming slime and raised to 75° (24° C.), and then filtered through a standard drum or leaf filter 88 to obtain 35% solids at 238 ton/hour. The water from filtration, 5200 gallons per minute (28,240 lpm) is passed through a second heat exchanger (not shown) to provide a first portion of the secondary cooling means 34. The filtered water enters the heat exchanger at 75° F. (24° C.) and emerges at 88° F. (31° C.), at which point it is recycled back to the mine.

The power supply of the present example comprises a gas turbine fed by a coal gasifier and exhausting to a steam boiler which in turn drives an absorption chiller to provide a second portion of the secondary cooling means 34. The coal gasifier is 80% efficient, using 2.44 ton/hr (2.16 metric) or $5.9 \times 10^7$ Btu/hr (Btu/hr$\times 0.252=$Cal., kg/hr) to produce $4.7 \times 10^7$ Btu/hr coal gas. The gas turbine is 32% efficient, producing mechanically 5,900 Hp ($3.8 \times 10^6$ Cal., kg/hr) to a compressor delivering three refrigerant compression outputs and $3.2 \times 10^7$ Btu/hr exhaust gas to a steam boiler. The compressor outputs $3.08 \times 10^6$ lbs/hr ($1.39 \times 10^6$ kg/hr) of butane refrigerant to the condenser tank 56 where the butane is liquified. The majority of butane refrigerant, for purposes of the present example, is pumped directly through line 86, which is not subjected to secondary cooling, to the condenser tank. The butane is liquified in the condenser tank at 35° F. (2° C.) and 16 psia (109 kPa) and passes at that pressure through line 62 to the evaporative bubbler 66. The compressor also outputs butane to an absorption chiller 34a driven by steam from the steam boiler. Butane leaves the absorption chiller at 80,000 lbs/hr., 40° F., and 17 psia (36,288 kg/hr., 4° C., 117 kPa). This butane then passes through an expansion device 64 to the evaporator tank 68. A third refrigerant output from the compressor 32 goes to the first portion of the secondary cooling means 34, the heat exchanger referred to above as warming filtered product water. Butane leaves the heat exchanger at 95° F., 256,000 lb/hr, and 48 psia (35° C., 116,122 kg/hr, 331 kPa) and passes through an expansion device to evaporating tank 68. Butane vapor is collected at the top of the evaporator tank at 29° F., 14 psia, from which it is transferred through line 74 at $3.4 \times 10^6$ lbs/hr. ($1.5 \times 10^6$ kg/hr) back to the compressor.

In the preceding example, butane in the condenser is at 35° F. (2° C.), while butane vapor removed from the evaporator is at 29° F. ($-2°$ C.). The freeze temperature of the slime was assumed to be 0° C. The known freeze temperatures of phosphate slime are approximately $-8°$ C. to 0° C. A high C.O.P. in accordance with equation (1) above is thereby maintained. A narrow temperature range, 2°–10° C., around the freeze temperature of the slime is possible and desirable with the systems of the present invention. Insulating the tank or tanks where condensation and evaporation take place will also improve thermal efficiency. The foregoing example also demonstrates the near atmospheric pressures at which the components of the systems of the present invention operate. High stress and strengthening designs are thereby obviated.

While the foregoing method and apparatus for continuously freezing and melting a fluid mixture have been disclosed with reference to illustrative and preferred embodiments, the inventive concepts disclosed may be variously modified without departing from the scope of the present invention. Thus, for instance, the power supply of the present invention may be used in a system wherein clearing of the ice from the evaporator is accomplished by a rotating drum and blade apparatus as is known in the art. The fluid mixture may also be partly frozen, with the unfrozen portion recycled for further freezing. Various rates of freezing the fluid mixture may be obtained with the present invention. Various additives and thickeners, for example, carbon tetrachloride, benzene, fuel oil, glycerine, alcohol and acetone may be added to improve filterability. Thus, it is intended that the appended claims be construed to include alternative embodiments of the inventive concepts disclosed herein, except insofar as limited by the prior art.

What is claimed is:

1. A method for continuously freezing a fluid mixture into a frozen fluid and melting said frozen fluid to produce a concentrated component and a dilute component, comprising:
    gasifying coal to produce fuel for a gas turbine, providing, from said gas turbine, mechanical energy with heat by-product energy;
    compressing refrigerant with said mechanical energy;
    cooling said refrigerant with said heat by-product energy;
    warming said frozen fluid to produce melted frozen fluid by condensing said refrigerant;
    evaporating said refrigerant by absorbing heat from and freezing said fluid mixture to form said frozen fluid, and
    carrying out said condensing and said evaporating at temperatures within a narrow temperature range around the freezing temperature of the fluid mixture.

2. The process of claim 1 further comprising the step of:
    refreezing at least a portion of said fluid mixture.

3. The process of claim 1 wherein said evaporating and freezing step is carried out within a short time after said warming step.

4. The process of claim 1 further comprising the step of:
    removing said frozen fluid from said fluid mixture.

5. The method of claim 1 wherein said evaporating step is carried out by directly contacting said refrigerant with said fluid mixture.

6. The method of claim 5 wherein said warming step is carried out by directly contacting said refrigerant with said frozen fluid.

7. Apparatus for continuously freezing and melting a fluid mixture and outputting a concentrated component and a dilute component of said fluid mixture, comprising:
    a compressor for compressing vaporized refrigerant;
    a first bubbler for bubbling substantially all of said vaporized refrigerant into said dilute component of said fluid mixture in a first container, said refrigerant being substantially immiscible and unreactive with the fluid mixture and less dense than the fluid mixture, whereby said refrigerant is condensed in said first container, and whereby frozen fluid in the first container is melted into dilute component;
    means for delivering condensed refrigerant from said first container to a second container;
    a second bubbler for bubbling condensed refrigerant into said second container, whereby said refrigerant is vaporized and said fluid mixture is frozen into said frozen fluid and said concentrated component;
    means for inputting fluid mixture to the second container;
    means for delivering vaporized refrigerant from the second container to said compressor;
    means for delivering said frozen fluid from said second container to said first container;
    means for removing said concentrated component and said dilute component from said apparatus;
    a turbine for driving said compressor; and
    secondary cooling means for cooling said refrigerant, said secondary cooling means being supplied with power by by-product heat from said turbine.

8. The apparatus of claim 7 wherein said turbine is a gas turbine and further comprising:
    a coal gasifier operatively connected to said gas turbine.

9. The apparatus of claim 8 wherein said secondary cooling means comprises:
    Rankine cycle apparatus driven by said gas turbine; and
    compression refrigeration apparatus operatively connected to said Rankine cycle apparatus.

10. The apparatus of claim 9 wherein said secondary cooling means cools the refrigerant between said compressor and said first container.

11. Apparatus for continuously freezing and melting a fluid mixture comprising:

motor means for producing mechanical energy and by-product heat;

compressor means driven by the mechanical energy of said motor means for compressing a refrigerant;

secondary cooling means producing secondary output cooling, said secondary output cooling being used substantially entirely for cooling said refrigerant passing between said compressor means and a condensor means, said secondary cooling means being supplied with power by said by-product heat from said motor means;

evaporator means for evaporating said refrigerant and for freezing said fluid mixture into frozen fluid; and said condensor means for condensing said refrigerant by warming said frozen fluid with heat from substantially all of said refrigerant;

the evaporator means, condensor means, cooling means and compressor means being constructed and arranged for providing a continuous refrigerant circuit wherein the refrigerant is at near atmospheric pressures and temperatures within a narrow temperature range around the freeze temperature of the fluid mixture.

12. The apparatus of claim 11 wherein said motor means is a gas turbine engine.

13. The apparatus of claim 12 further comprising:
a coal gasifier operatively connected to provide fuel to said gas turbine.

14. The apparatus of claim 11 wherein said secondary cooling means comprises an absorption chiller utilizing steam produced by said by-product heat.

15. The apparatus of claim 11 wherein said secondary cooling means comprises:

Rankine cycle apparatus driven by said gas turbine; and vapor compression refrigeration apparatus operatively connected to said Rankine cycle apparatus.

16. The apparatus of claim 11 further comprising:
means for exchanging heat between said fluid mixture and melted fluid.

17. The apparatus of claim 11 further comprising:
a fluid mixture container for containing a volume of fluid mixture; and wherein
said evaporator and said means for condensing are submerged in said volume of fluid mixture.

18. The apparatus of claim 17 wherein said evaporator comprises:
means for bubbling said refrigerant into direct contact with said input fluid.

19. The apparatus of claim 17 wherein said evaporator and said means for condensing comprise a plurality of plates.

20. The apparatus of claim 19 wherein said means for condensing are located in said container above said evaporator, whereby said frozen liquid can float from said evaporator to said condensing means.

21. The apparatus of claim 11 further comprising:
a container for containing a volume of fluid mixture, and wherein said means for condensing is submerged within said volume of fluid mixture.

22. The apparatus of claim 21 wherein said evaporator comprises means for bubbling said compressed refrigerant into direct contact with said fluid mixture.

23. The apparatus of claim 21 wherein said evaporator comprises plates and wherein said evaporator is submerged in said container below said means for condensing.

* * * * *